United States Patent
Kim et al.

(10) Patent No.: US 7,590,879 B1
(45) Date of Patent: Sep. 15, 2009

(54) CLOCK EDGE DE-SKEW

(75) Inventors: Henry Kim, San Jose, CA (US); Bonnie I. Wang, Cupertino, CA (US); ChiaKang Sung, Milpitas, CA (US); Joseph Huang, San Jose, CA (US)

(73) Assignee: Altera Corporation, San Jose, CA (US)

( * ) Notice: Subject to any disclaimer, the term of this patent is extended or adjusted under 35 U.S.C. 154(b) by 265 days.

(21) Appl. No.: 11/043,524

(22) Filed: Jan. 24, 2005

(51) Int. Cl.
*G06F 1/12* (2006.01)
*G06F 9/00* (2006.01)
*G06F 13/42* (2006.01)

(52) U.S. Cl. ............... 713/401; 713/400; 713/600
(58) Field of Classification Search ........... 713/400, 713/401, 500, 503, 600
See application file for complete search history.

(56) References Cited

U.S. PATENT DOCUMENTS

| | | | | |
|---|---|---|---|---|
| 5,258,660 A | * | 11/1993 | Nelson et al. | 327/141 |
| 5,978,929 A | * | 11/1999 | Covino et al. | 713/503 |
| 6,247,137 B1 | * | 6/2001 | Wickeraad | 713/401 |
| 6,473,890 B1 | * | 10/2002 | Yasui et al. | 716/10 |
| 6,798,241 B1 | * | 9/2004 | Bauer et al. | 326/40 |
| 6,895,522 B2 | * | 5/2005 | Johnson et al. | 713/401 |
| 6,918,048 B2 | * | 7/2005 | Zumkehr | 713/401 |
| 6,920,552 B2 | * | 7/2005 | Lin et al. | 713/1 |
| 6,950,350 B1 | * | 9/2005 | Kerl | 365/193 |
| 7,117,382 B2 | * | 10/2006 | Khieu et al. | 713/401 |
| 7,171,574 B2 | * | 1/2007 | Rosen | 713/401 |
| 7,366,862 B2 | * | 4/2008 | Nystuen et al. | 711/167 |
| 2003/0163750 A1 | * | 8/2003 | Trivedi et al. | 713/503 |
| 2004/0181704 A1 | * | 9/2004 | Gauthier et al. | 713/503 |
| 2007/0277071 A1 | * | 11/2007 | Chong et al. | 714/744 |

OTHER PUBLICATIONS

Nelson, V et al., Digital Logic Circuit Analysis and Design, 1995, Prentice Hall Inc., p. 406.*
Sidiropoulos, S. et al., A Semi-Digital DLL with Unlimited Phase Shift Capability and 0.08-400MHz Operating Range, IEEE International Solid State Circuits Conference, Feb. 8, 1997, pp. 332-333.*

* cited by examiner

*Primary Examiner*—Mark Connolly
(74) *Attorney, Agent, or Firm*—Townsend and Townsend and Crew LLP (57) ABSTRACT

Circuits, methods, and apparatus for deskewing rising and falling edges of a clock signal. One embodiment of the present invention utilizes a delay element in a data path to adjust a data signal such that a clock signal is centered relative to the data. A further embodiment of the present invention recovers a double-data rate signal using two flip-flops, one clocked by clock rising edges, the other clocked by clock falling edges. An additional delay element is inserted in front of one or both flip-flop clock inputs. If two additional delay elements are used, they are independently adjustable such that each edge can be independently adjusted for improved data recovery.

25 Claims, 9 Drawing Sheets

CLOCK EDGE DE-SKEW

BACKGROUND

The present invention relates generally to high-speed data interfaces and more particularly to circuitry for deskewing clock edges at high-speed data interfaces.

Modern computing and other electronic systems are handling more data at higher data rates than ever. Interfaces where one integrated circuit communicates with another integrated circuit, or one portion of an integrated circuit communicates with anther portion of an integrated circuit, are often bottlenecks that limit the ability of data to move around an electronic system. For example, interfaces to memory devices are one of the limiting function blocks in modern computing systems.

An example of such an interface is a double data-rate (DDR) memory interface, or more generally a multiple data-rate interface. A DDR interface is a synchronous (that is, clocked) interface where data is clocked on each edge of a clock signal. Specifically, alternating data bits in a DDR signal are clocked on the rising and falling edges of a clock signal.

Typically, data (a DQ signal) is provided along with a clock signal (a DQS signal) by a transmitting device or circuit. The clock signal has a rising or falling edge at each point where a transition in the data can occur. The receiving device or circuit shifts the clock signal by 90 degrees such that the edges of the clock are centered, that is midway, between edges of the data signal. By using two flip-flops, one clocked by rising edges and the other clocked by falling edges, the data signal can be recovered and errors and jitter in data signal edges have a minimized effect. This is referred to as centering the clock signal, or as window centering. Several things can conspire to skew rising and falling edges of clock signals such that data recovery is more error prone. For example, integrated and printed circuit board traces, circuits, and loads have inductive and capacitive effects that can cause the clock edges to skew. Further, circuits that generate and provide a clock signal may have mismatches between their ability to charge and discharge these parasitics and loads. These cause the rising and falling edges of the clock signal to become skewed.

Thus, what is needed are circuits, methods, and apparatus for deskewing clock rising and falling edges such that these clock edges are centered for a corresponding data signal.

SUMMARY

Accordingly, embodiments of the present invention provide circuits, methods, and apparatus for deskewing rising and falling edges of a clock signal. One embodiment of the present invention utilizes a delay line or element in a data path to adjust a data signal such that a clock signal is centered relative to the data. A further embodiment of the present invention recovers data using two flip-flops, one clocked by clock rising edges, the other clocked by clock falling edges. An additional delay element is inserted in front of one or both clock input lines. If two additional delay elements are used, they can be independently adjustable. In this way, each edge is independently adjusted for improved data recovery. Embodiments of the present invention may incorporate one or more of the these or the other features described herein.

A better understanding of the nature and advantages of the present invention may be gained with reference to the following detailed description and the accompanying drawings.

DESCRIPTION OF EXEMPLARY EMBODIMENTS

Figure 1:
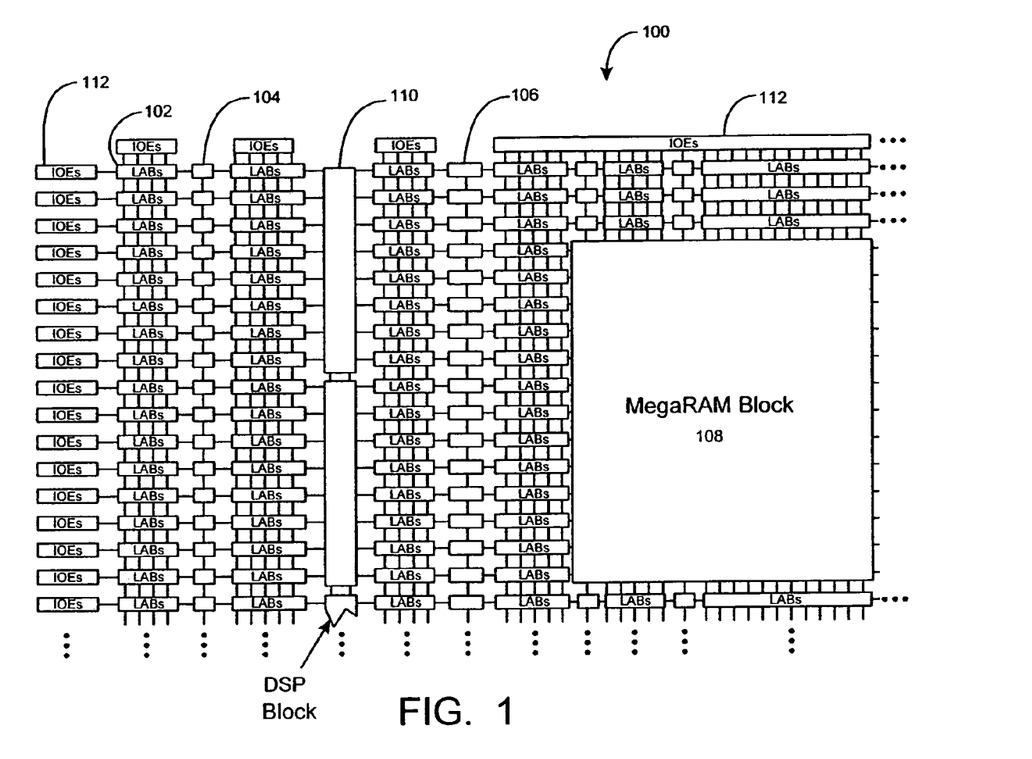
FIG. 1 is a simplified block diagram of a programmable logic device that may benefit by incorporating embodiments of the present invention.

FIG. 1 is a simplified partial block diagram of an exemplary high-density programmable logic device 100 wherein techniques according to the present invention can be utilized. PLD 100 includes a two-dimensional array of programmable logic array blocks (or LABs) 102 that are interconnected by a network of column and row interconnections of varying length and speed. LABs 102 include multiple (e.g., 10) logic elements (or LEs), an LE being a small unit of logic that provides for efficient implementation of user defined logic functions.

PLD 100 also includes a distributed memory structure including RAM blocks of varying sizes provided throughout the array. The RAM blocks include, for example, 512 bit blocks 104, 4K blocks 106 and an M-Block 108 providing 512K bits of RAM. These memory blocks may also include shift registers and FIFO buffers. PLD 100 further includes digital signal processing (DSP) blocks 110 that can implement, for example, multipliers with add or subtract features.

It is to be understood that PLD 100 is described herein for illustrative purposes only and that the present invention can be implemented in many different types of PLDs, FPGAs, and the other types of digital integrated circuits.

Figure 2:
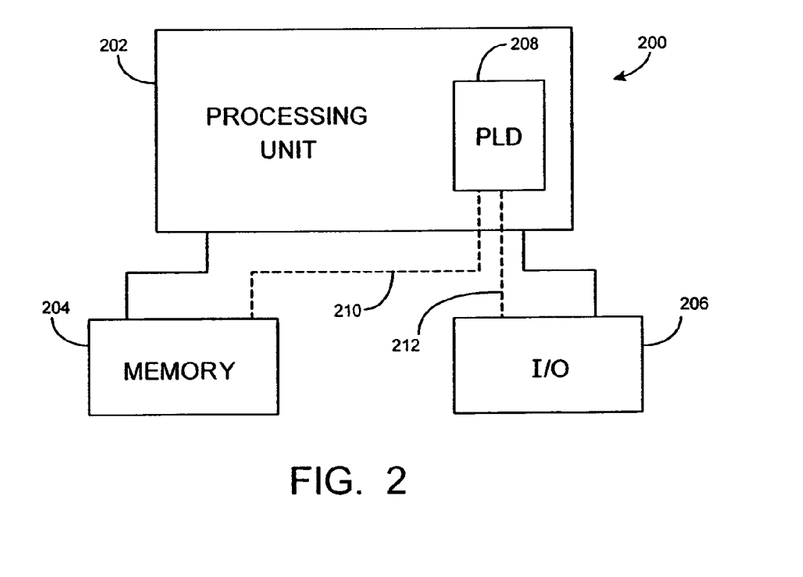
FIG. 2 is a block diagram of an electronic system that may benefit by incorporating embodiments of the present invention.

While PLDs of the type shown in FIG. 1 provide many of the resources required to implement system level solutions, the present invention can also benefit systems wherein a PLD is one of several components. FIG. 2 shows a block diagram of an exemplary digital system 20Q, within which the present invention may be embodied. System 200 can be a programmed digital computer system, digital signal processing system, specialized digital switching network, or other processing system. Moreover, such systems may be designed for a wide variety of applications such as telecommunications systems, automotive systems, control systems, consumer electronics, personal computers, Internet communications and networking, and others. Further, system 200 may be provided on a single board, on multiple boards, or within multiple enclosures.

System 200 includes a processing unit 202, a memory unit 204 and an I/O unit 206 interconnected together by one or more buses. According to this exemplary embodiment, a programmable logic device (PLD) 208 is embedded in processing unit 202. PLD 208 may serve many different purposes within the system in FIG. 2. PLD 208 can, for example, be a logical building block of processing unit 202, supporting its internal and external operations. PLD 208 is programmed to implement the logical functions necessary to carry on its particular role in system operation. PLD 208 may be specially coupled to memory 204 through connection 210 and to I/O unit 206 through connection 212.

Processing unit 202 may direct data to an appropriate system component for processing or storage, execute a program stored in memory 204 or receive and transmit data via I/O unit 206, or other similar function. Processing unit 202 can be a central processing unit (CPU), microprocessor, floating point coprocessor, graphics coprocessor, hardware controller, microcontroller, programmable logic device programmed for use as a controller, network controller, and the like. Furthermore, in many embodiments, there is often no need for a CPU.

For example, instead of a CPU, one or more PLD 208 can control the logical operations of the system. In an embodiment, PLD 208 acts as a reconfigurable processor, which can be reprogrammed as needed to handle a particular computing task. Alternately, programmable logic device 208 may itself include an embedded microprocessor. Memory unit 204 may be a random access memory (RAM), read only memory (ROM), fixed or flexible disk media, PC Card flash disk memory, tape, or any other storage means, or any combination of these storage means.

Embodiments of the present invention may be used to improve circuits that interface with the memory unit 204. While embodiments of the present invention particularly benefit these interface circuits when memory unit 204 is a double-data rate (DDR) type memory, embodiments may benefit other multiple-data rate types interfaces that are either now known or later developed.

Figure 3:
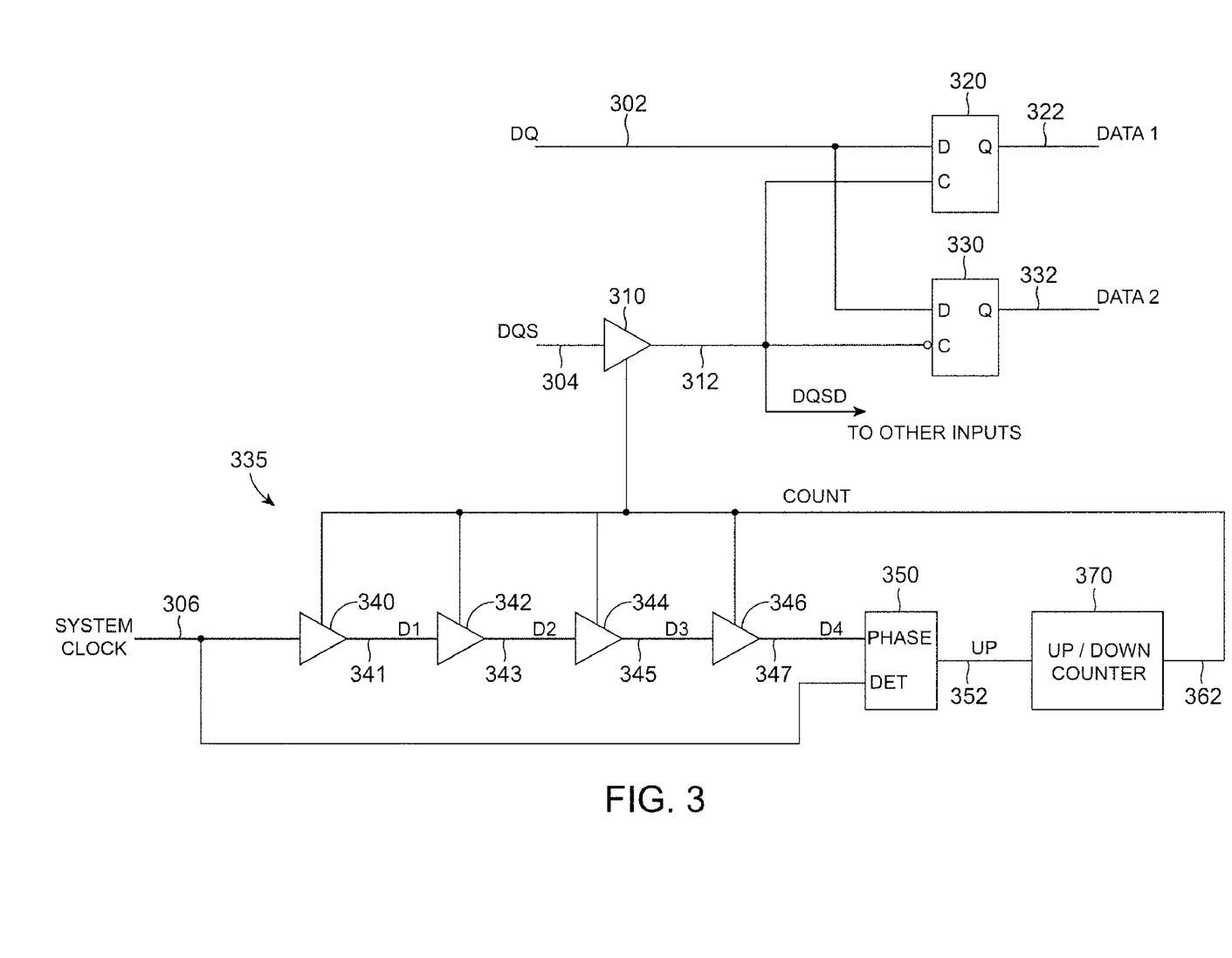
FIG. 3 is a schematic of a high speed data input and associated clock phase-shift circuitry that may be improved by incorporating an embodiment of the present invention.

FIG. 3 is a schematic of a high speed data input cell and associated clock phase shift circuitry that may be improved by incorporating an embodiment of the present invention. This schematic includes an input cell including flip-flops 320 and 330, clock phase-shift circuit 310, and delay-locked loop 335. The delay-locked loop 335 includes the delay elements 340, 342, 344, and 346, phase detector 350, and up/down counter 370. This figure, as with the other included figures, is shown for illustrative purposes and does not limit either the possible embodiments of the present invention or the claims.

A double data rate signal DQ is received on line 302 by flip-flops 320 and 330. A data strobe or clock signal DQS is received on line 304 by phase-shift circuit 310. The phase-shift circuit 310 typically provides approximately a 90 degree phase shift and outputs a signal DQSD on line 312. The phase-shifted clock signal DQSD on line 312 clocks flip-flop 320 on its rising edges and flip-flop 330 on its falling edges. In this way, data DQ on line 302 is clocked on rising and falling edges of the clock signal DQSD on line 312. The flip-flops 320 and 330 provide data outputs DATA1 on line 322 and DATA2 on line 332. The data outputs DATA1 on line 322 and DATA2 on line 332 operate at one-half the frequency of the data signal DQ on line 302.

The delay-locked loop 335 receives the system clock signal on line 306 and provides a digital count on bus or lines 362 to the phase shift circuit 310. The delay-locked loop 335 acts to adjust the phase shift through the phase-shift circuit 310 to be approximately 90 degrees.

The system clock signal is received on line 306 by the first delay element 340. The delay element 340 provides an output D1 on 341, which is received by the second delay element 342. The second delay element in turn provides an output D2 on line 343 to the third delay element 334. The third delay element 334 provides an output D3 on line 345 to the fourth delay element 346. The fourth delay element 346 provides an output D4 on line 347, the phase of which is compared to the phase of the system clock signal on line 306.

When the four delay elements 340, 342, 344, and 346, each provides approximately 90 degrees phase shift, the four delay elements cumulatively provide a 360 degree phase shift. Alternately, two delay elements may be used, each delay element providing 90 degrees phase shift where an additional 180 degree phase shift is made by inverting the output of one of the delay elements. When 360 degrees of phase shift are provided by the delay elements, the phases of the signals D4 on line 347 and the system clock on line 306 are aligned. The phase detector 350 compares the phase of the incoming signals and provides an up/down output on line 352 to the up/down counter 370. The up/down counter 370 adjusts its output count up or down under control of the control signal on line 352. In a specific embodiment, as the up/own counter counts up, the count on lines 362 increases, thus increasing the delays through the various delay elements. As the delay elements provide excess delay (delay greater than 90 degrees), the phase detector 350 provides a change in the control signal such that the up/down counter 370 counts down.

The delay element 310 is typically designed to match the delay elements 340, 342, 344, and 346, that is, the delay through the delay elements 310 matches the delay through each one of the delay elements 340, 342, 344, and 346. Accordingly, the clock signal received on line 304 is phase shifted approximately 90 degrees by the phase-shift circuit 310 before it is provided to the clock inputs of the first flip-flop 320 and second flip-flop 330.

In this configuration, when the rising edges are displaced or skewed from the falling edges after the 90 degree phase shift is applied by the phase-shift circuit 310, the timing at one or both of the flip-flops 320 or 330 is less than optimal. That is, when the delay incurred by the rising edges is not equal to the delay incurred by the falling edges, one or both of the clock edges are not centered in their corresponding data window.

Figure 4:
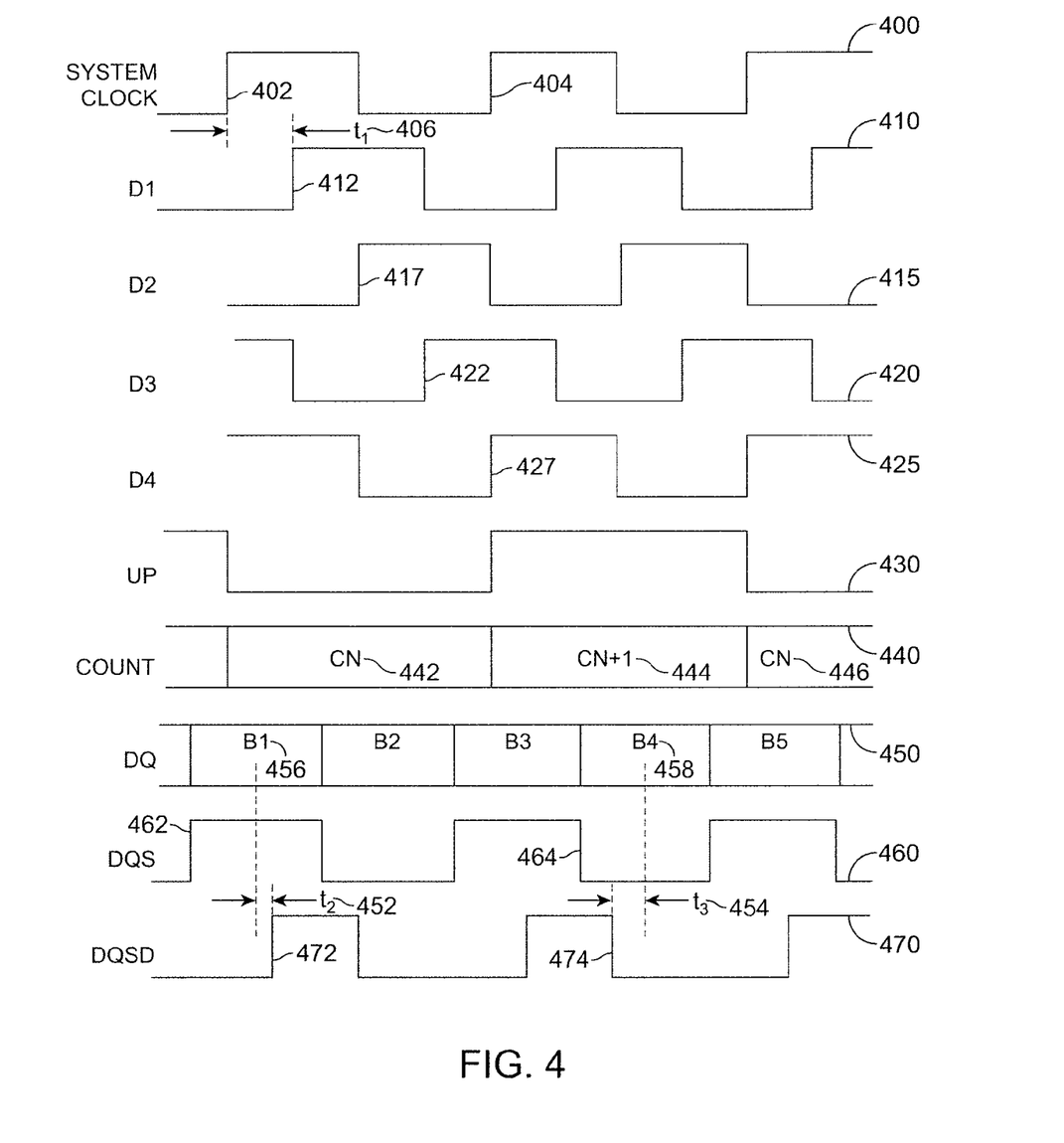
FIG. 4 is an exemplary timing diagram of the circuitry of FIG. 3.

FIG. 4 is an exemplary timing diagram of the circuitry of FIG. 3. This timing diagram includes the system clock 400, D1 410, D2 415, D3 420, D4 425, up 430, count 440, DQ 450, DQS 460, and DQSD 470. For clarity, these signals each have names that correspond to terminals or nodes in the circuitry shown in FIG. 3.

The system clock 400 is received by the delay-locked loop. The delay-locked loop delay elements generate signals D1 410, D2 415, D3 420, and D4 425. These signals are delayed from each other by a time shown here as $T_1$ 406. When the delay-locked loop is locked, the delay $T_1$ 406 roughly corresponds to one-fourth of a system clock cycle or 90 degrees. The DQ data signal 450 is received by the input cell, as is the DQ strobe signal DQS 460. Initially, the rising 462 and falling 464 edges of the DQS signal 460 are aligned to transition locations in the DQ signal 450. The DQS signal 460 is then phase-shifted by 90 degrees relative to the DQS signal 460 such that its rising edge 472 is aligned to the center of data bit B1 456 of DQ 450 and the falling edge 474 is similarly aligned to the center of the data bit B4 458.

In this particular example, the rising edge 472 of the DQSD signal 470 is skewed by an amount $T_2$ 452, while falling edge 474 is skewed by time $T_3$ 454. In this case, if the phase shift through the phase element is adjusted to compensate for either the rising edge 472 or falling edge 474, the other edge has an even greater associated error.

For example, if the phase shift is reduced, the rising edge 472 is more closely aligned to the center of data bit B1 456 of DQ 450. However, the falling edge 474 has a greater error, that is, it is farther away from the center of data bit B4 458.

Figure 5:
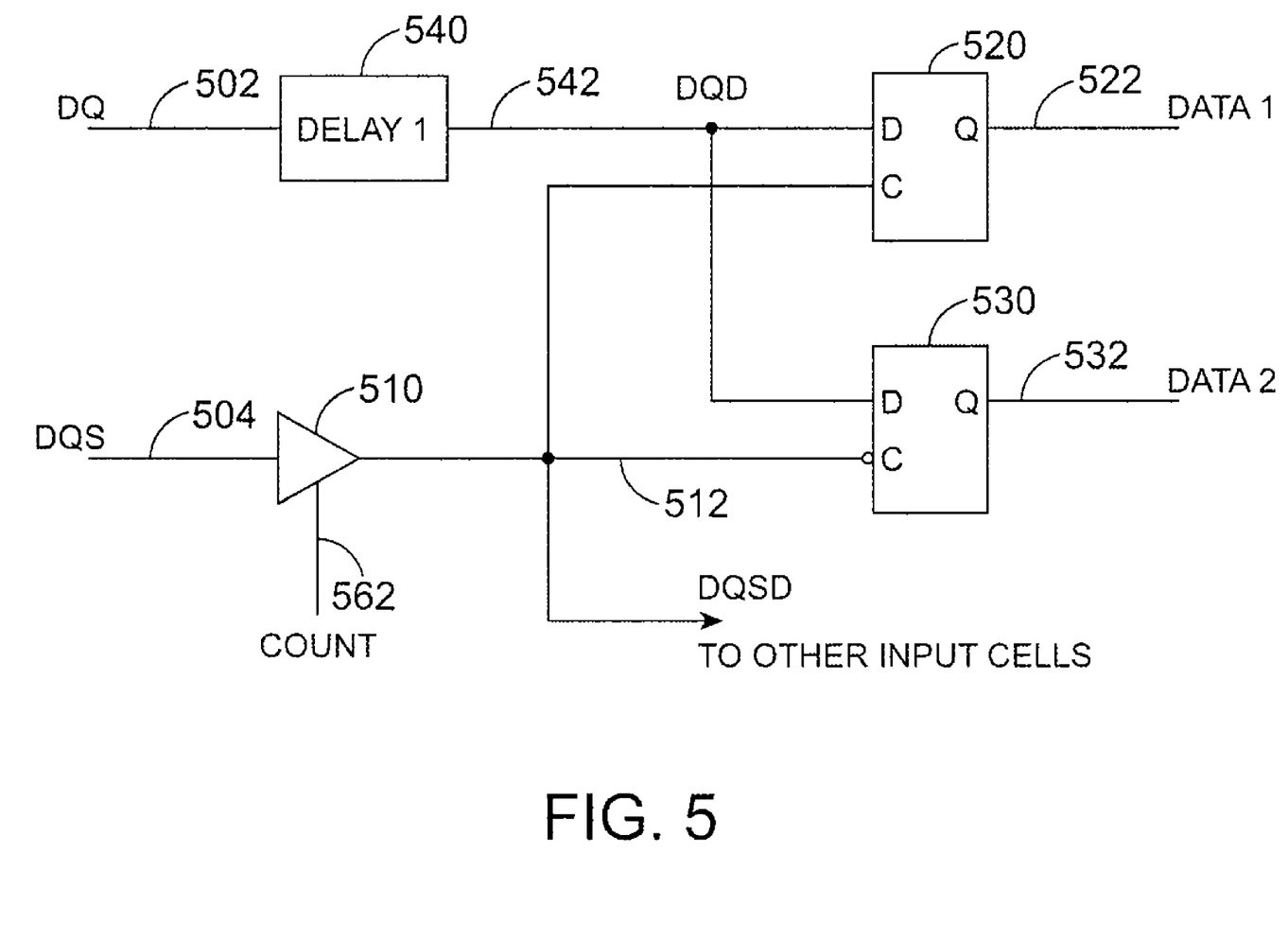
FIG. 5 is a schematic of an embodiment of the present invention.

FIG. 5 is a schematic of an embodiment of the present invention. This schematic includes flip-flops 520 and 530, phase-shift circuit 510, and delay elements 540. A double data rate signal DQ is received on line 502 and delayed by delay element 540 which provides an output DQD on line 542. The signal DQD on line 542 is received by the inputs of the first flip-flop 520 and second flip-flop 530.

The DQ strobe signal DQS is received on line 504 by the phase-shift circuit 510. The phase-shift circuit 510 is controlled by the count signal on line 562. In this figure, the delay-locked loop is not shown for clarity, though the delay-locked loop of FIG. 3 or other appropriate delay-locked loop or phase-locked loop may be used. The phase-shift circuit 510 provides a phase shifted clock output DQSD on line 512. Data is clocked by the first flip-flop 520 on rising edges of the signal DQSD on line 512 and on falling edges by the second flip-flop 530. The first and second flip-flops provide outputs DATA1 on line 522 and DATA2 on line 532. Again, the data rate of the signals DATA1 on line 522 DATA2 on line 532 are one-half the frequency of the data signal DQ on line 502.

This circuit provides a delay element 540 in the data signal path such that errors caused by skews between rising and falling edges of the DQS signal on line 512 can be averaged. An example of how this is done is shown in the following timing diagram.

Figure 6:
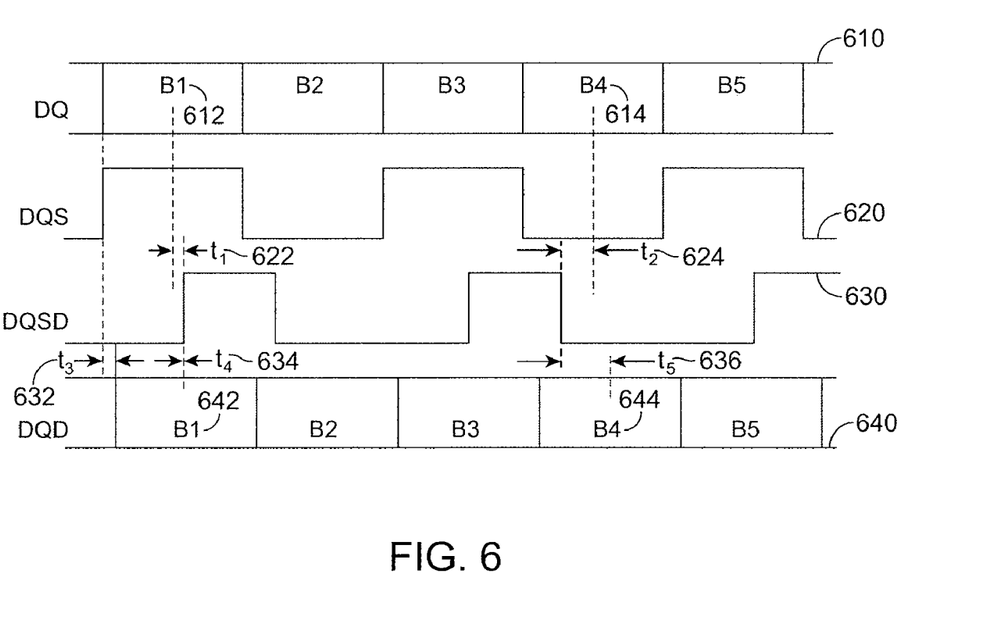
FIG. 6 is an exemplary timing diagram of the circuitry of FIG. 5.

FIG. 6 is an exemplary timing diagram of the circuitry of FIG. 5. This timing diagram includes data signal DQ 610, data strobe signal DQS 620, delayed data strobe signal DQSD 630, and delayed data signal DQD 640. Again, each of these signals correspond to signals on similarly named nodes in FIG. 5.

A data signal DQ 610 and strobe signal DQS 620 are received. The DQS signal 610 has rising and falling edges approximately aligned with possible data transitions of the data signal DQ 610. The signal DQS 620 is phase shifted by approximately 90 degrees and provided as DQSD 630. Due to effects such as capacitive loading, driver mismatches, and the like, the rising edges and falling edges of 630 are misaligned from the centers of the data windows by an amount $T_1$ 622 and $T_2$ 624 respectively. In this particular case, the delay error $T_1$ 622 is relatively less than the delay error $T_2$ 624.

Accordingly, data signal DQ 610 is delayed by an amount $T_3$ 632 and provided as data signal DQD 640. In this case, the resulting window center errors $T_4$ 634 and $T_5$ 636 are a approximately equal. In this particular example, the errors $T_1$ 622 and $T_2$ 624 are averaged by delaying the data signal DQ 610.

In the previous example, the data signal DQ 610 is delayed relative to the strobe signal DQS 620. In other situations, the strobe signal DQS 620 may need to be delayed relative to the data signal DQ 610. Accordingly, in one embodiment of the present invention, a phase-shift circuit for the strobe signal DQS 620 is designed to provide a phase shift that is some excess amount greater than 90 degrees. If the data signal DQ 610 is delayed less than this excess amount, then the strobe signal DQS 620 is delayed relative to the data signal DQ 610.

As can be seen, the approach taken in FIG. 5 helps mitigate any skew between the rising and falling edges of DQSD 630 by averaging the mismatch in delay between them. Unfortunately, it does not eliminate these errors. To do this, the rising edges seen by flip-flop 520 and falling edges seen by flip-flop 530 are adjusted independently. A schematic of an exemplary circuit that performs these functions is shown in FIG. 7.

Figure 7:
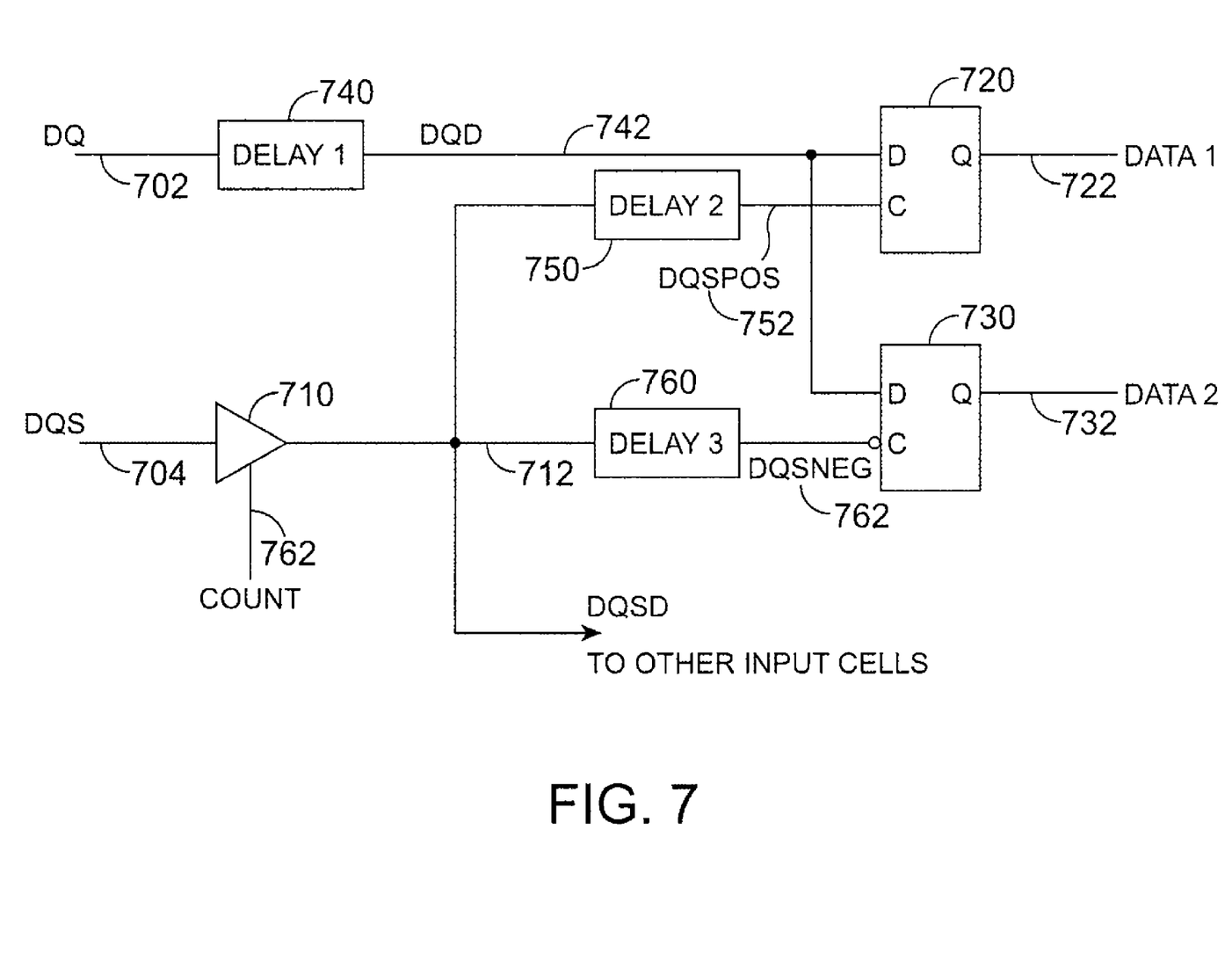
FIG. 7 is a schematic of another embodiment of the present invention.

FIG. 7 is a schematic of another embodiment of the present invention. Included are a first flip-flop 720, second flip-flop 730, first delay element 740, second delay element 750, third delay element 760, and phase-shift circuit 710. The data signal DQ is received on line 702 by the delay element 740, which in turn provides data output DQD on line 742. The data signal DQD on line 742 is received by the "D" inputs of the first flip-flop 720 and the second flip-flop 730.

The data strobe signal DQS on line 704 is received by the phase-shift circuit 710. The phase-shift circuit 710 is under control of the count signal 762 from a delay-locked loop or phase-locked loop as shown in previous embodiments and circuits. The output of the phase-shift circuit 710 is delayed by delay elements delay2 750 and delay3 760, and provided to the clock inputs of the first flip-flop 720 and second flip-flop 730 respectively. The output of the flip-flops are provided on line DATA1 722 and DATA2 732. As before, the data rates of the data signals DATA1 on line 722 and DATA2 on line 732 are one-half the frequency of the data rate of the signal DQ on line 72.

In this way, the delays through the delay elements delay2 750 and delay3 760 can be independently adjusted to match or align to the center of the windows for the data bits of the data signal DQD on line 742. This in turn allows optimal data recovery of the data signal DQ on line 702.

It will be appreciated by one skilled in the art that other configurations are possible. For example, the DQSD signal on line 712 is shown as being provided to other input cells, Alternately, the outputs of the delay elements 750 and 760, DQSPOS on line 752 and DQSNEG on line 762 may be provided to other input cells.

Figure 8:
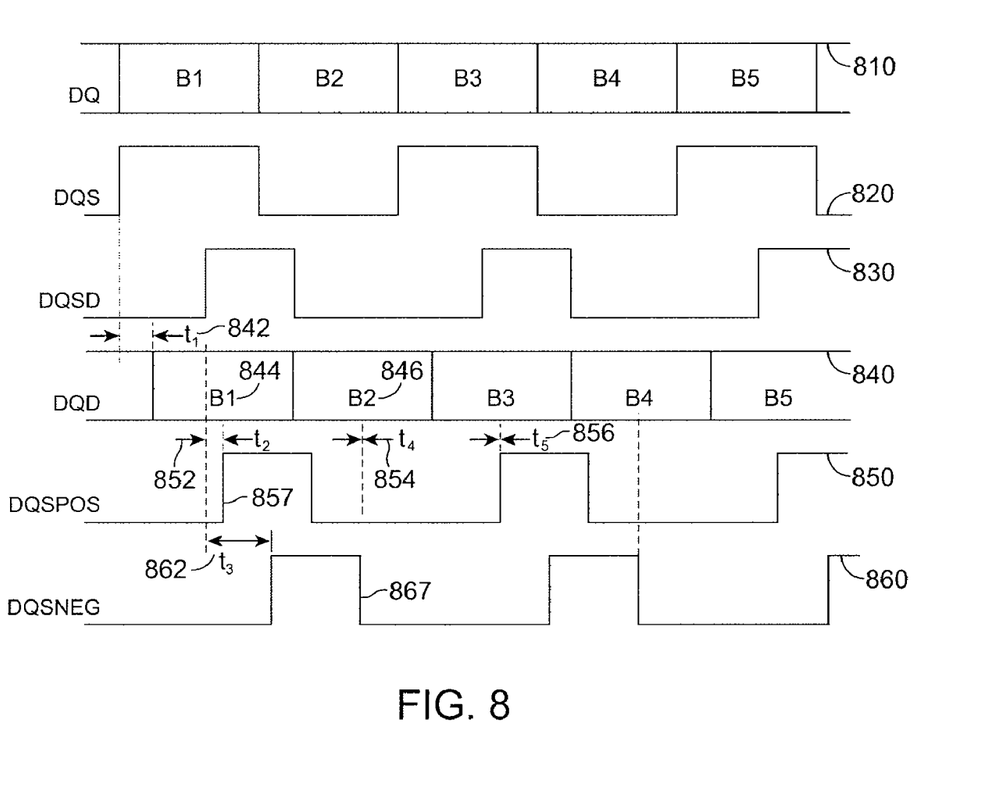
FIG. 8 is an exemplary timing diagram of the circuitry of FIG. 7.

FIG. 8 is an exemplary timing diagram of the circuitry of FIG. 7. This timing diagram includes data signal DQ 810, data strobe signal DQS 820, delayed data strobe signal DQSD 830, delayed data signal DQD 840, and delayed-phase-shifted clock signals DQSPOS 850 and DQSNEG 860. As before, these signals have names that correspond to node names in the circuitry shown in FIG. 7.

The data signal DQ 810 and strobe signal DQS 820 are received by the input cells. The data strobe signal DQS 820 is phase shifted and provided as DQSD 830. As before, the phase-shifted strobe signal 830 has rising and falling edges that are not aligned to the center of the data bits of DQ 810. In this particular example, this is compensated by delaying the data signal and providing it as DQD 840. Specifically, the data signal is delayed by amount $T_1$ 842.

The phase-shifted strobe signal DQSD 830 is further delayed by the second and third delay elements to provide DQSPOS 850 and DQSNEG 860. To be specific, DQSD is delayed by an amount $T_2$ 852 in order to generate DQSPOS 850, while DQSD is delayed by an amount $T_3$ 862 to generate DQSNEG 860.

After these delays, the rising edge 857 is centered on data bit B1 844 of DQD 840, while the falling edge 867 of DQSNEG 860 is centered on data bit B2 846 of DQD 840.

In this embodiment, the rising edges and falling edges of the phase-shifted strobe signal are by delayed differing amounts to compensate for skews caused by such factors as trace capacitance and inductance, driver rising and falling edge mismatches, and other factors such as printed circuit board and bondwire effects. Since these errors are reduced by adding delay to the strobe signal, a compensating delay is inserted in the data signal path.

Figure 9:
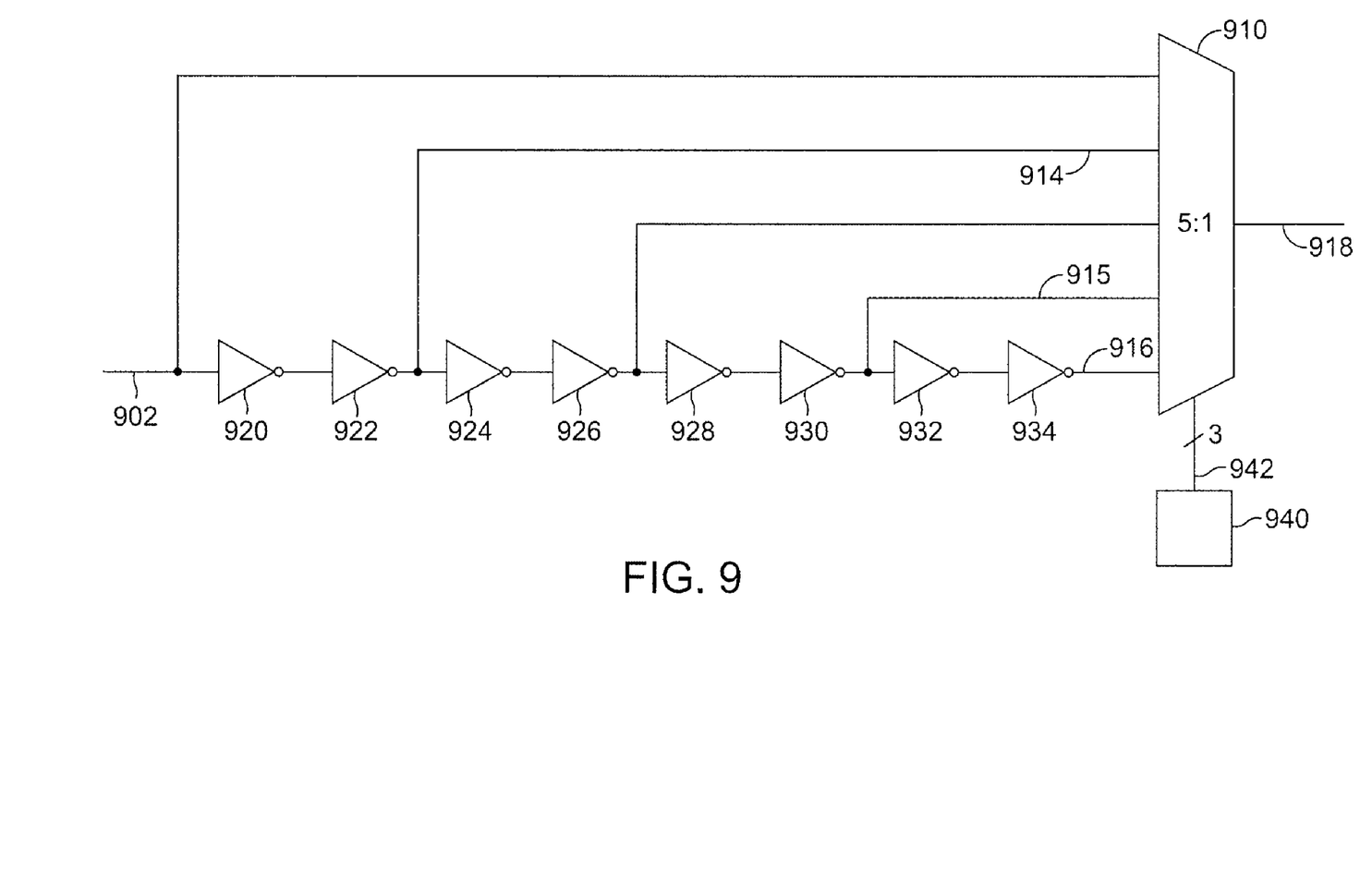
FIG. 9 is a schematic of a delay element that may be used as the delay elements in FIGS. 5 and 7 or as a delay element in other embodiments of the present invention.

FIG. 9 is a schematic of a delay element that may be used as the delay elements in FIGS. 5 and 7 or as a delay element in other embodiments of the present invention. This delay element includes buffers, inverters, or delay circuits 920, 922, 924, 926, 928, 930, 932, and 934, as well as multiplexer 910, and memory locations 940.

The signal to be delayed is received on line 902 and delayed by the series of delay circuits. Occasional outputs from this series are provided as inputs to multiplexer 910. The multiplexer 910 selects one of these inputs and provides an output signal on line 918. For example, for a minimum delay, the signal on line 902 is selected by multiplexer 910 and provided as an output on line 918. For a maximum delay, the signal on line 916 is selected by multiplexer 910 and provided as an output on line 918. The memory locations 940 provide signals on lines 942 to the multiplexer 910. These bits control which input to the multiplexer is provided as an output on line 918.

Figure 10:
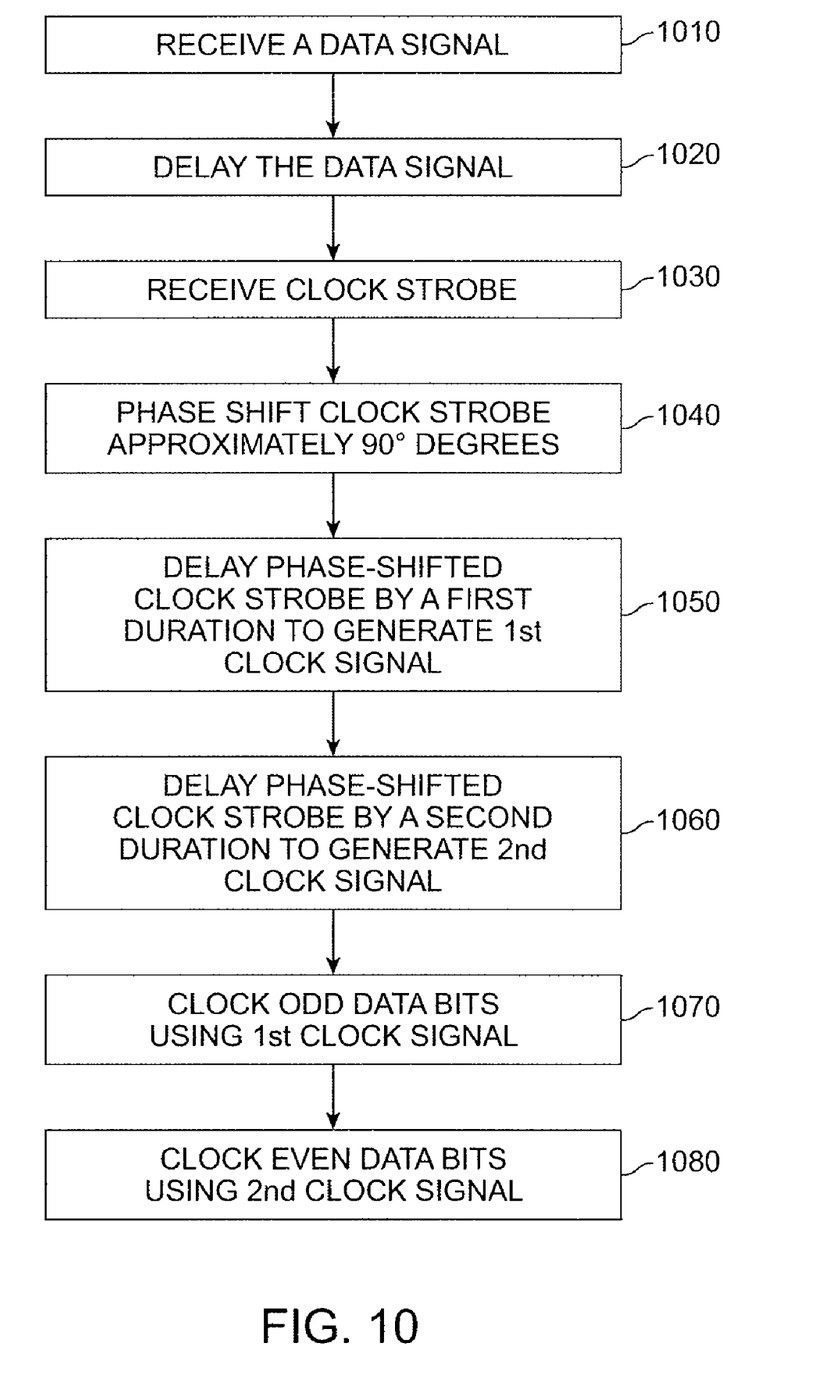
FIG. 10 is a flow chart illustrating a method of deskewing edges of a clock signal according to an embodiment of the present invention.

FIG. 10 is a flow chart illustrating a method of deskewing edges of a clock signal according to an embodiment of the present invention. In act 1010, a data input signal is received. This data signal is delayed in act 1020. In act 1030, a clock strobe signal is received, and is phase shifted approximately 90 degrees in act 1040.

The phase shifted clock strobe signal is delayed by a first duration to generate a first clock signal in act 1050. The phase-shifted clock strobe signal is delayed a second duration to generate a second clock signal in act 1060. In act 1070, the even data bits of the delayed data signal are clocked using the first clock signal, while the odd data bits are clocked using the second clock signal in act 1080.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A method of receiving a data input signal comprising:
   delaying a first clock signal a first duration to generate a second clock signal;
   delaying the second clock signal an adjustable second duration to generate a third clock signal to compensate for skew in the rising edges of the second clock signal;
   delaying the second clock signal an adjustable third duration to generate a fourth clock signal to compensate for skew in the falling edges of the second clock signal;
   retiming a first data signal using rising edges of the third clock signal; and
   retiming the first data signal using falling edges of the fourth clock signal,
   wherein the adjustable second and third durations are independently adjustable.

2. The method of claim 1 wherein delaying the first clock signal the first duration provides a 90 degree phase shift.

3. The method of claim 2 further comprising:
   receiving a data input signal; and
   delaying the data input signal a fourth duration to generate the first data signal.

4. The method of claim 2 wherein the first data signal is retimed by a double data rate input cell.

5. The method of claim 1 wherein the skew in the rising and falling edges of the second clock signal are at least partially due to inductive and capacitive effects of a circuit trace.

6. An integrated circuit comprising:
   a phase shift circuit to phase shift a clock input signal;
   a first adjustable delay circuit to delay the phase-shifted clock input signal, wherein the first adjustable delay circuit independently adjusts an output of the phase shift circuit to compensate for skew in rising edges of the output of the phase shift circuit;
   a second adjustable delay circuit to delay the phase-shifted clock input signal, wherein the second adjustable delay circuit independently adjusts the output of the phase shift circuit to compensate for skew in falling edges of the output of the phase shift circuit;
   a first retiming circuit to retime a first data signal to rising edges of the phase-shifted clock input signal delayed by the first adjustable delay circuit; and
   a second retiming circuit to retime the first data signal to falling edges of the phase-shifted clock input signal delayed by the second adjustable delay circuit.

7. The integrated circuit of claim 6 further comprising:
   a third adjustable delay circuit to receive a data input signal and provide the first data signal.

8. The integrated circuit of claim 6 wherein the phase shift circuit provides approximately a 90 degree phase shift.

9. The integrated circuit of claim 8 wherein the phase shift provided by the phase shift circuit is controlled by a delay-locked loop.

10. The integrated circuit of claim 9 wherein the first and second adjustable delay circuits comprise:
    a series of inverters having a plurality of outputs; and
    a multiplexer having a plurality of inputs coupled to the plurality of outputs of the series of inverters.

11. The integrated circuit of claim 6 wherein the first and second retiming circuits are part of a double-data rate input cell.

12. The integrated circuit of claim 11 wherein the integrated circuit is a field programmable gate array.

13. The integrated circuit of claim 6 wherein the skew in the rising and falling edges of the output of the phase shift circuit are at least partially due to inductive and capacitive effects of a circuit trace.

14. An integrated circuit comprising:
    a first phase shift circuit, wherein the first phase shift circuit is coupled to receive a clock signal and configured to phase shift the clock signal by approximately 90 degrees;
    a first delay circuit coupled to an output of the first phase shift circuit, wherein a first delay provided by the first delay circuit is adjustable in increments of less than 90 degrees;
    a second delay circuit coupled to the output of the first phase shift circuit, wherein a second delay provided by the second delay circuit is adjustable in increments of less than 90 degrees, wherein each of the first delay circuit and the second delay circuit provide a delay of less than 90 degrees;
    a first retiming circuit having a clock input coupled to an output of the first delay circuit; and
    a second retiming circuit having a clock input coupled to an output of the second delay circuit, wherein the first delay circuit adjustably delays the output of the first phase shift circuit to compensate for skew in the rising edges of the output of the first phase shift circuit, and the second delay circuit adjustably delays the output of the first phase shift circuit to compensate for skew in the falling edges of the output of the first phase shift circuit, and wherein an amount of delay of the first delay circuit is independently adjustable.

15. The integrated circuit of claim 14 wherein the first retiming circuit is rising-edge triggered and the second retiming circuit is falling-edge triggered.

16. The integrated circuit of claim 15 wherein the first retiming circuit and the second retiming circuit are flip-flops.

17. The integrated circuit of claim 16 wherein the flip-flops are D flip-flops.

18. The integrated circuit of claim 15 further comprising:
a third delay circuit having an output coupled to an input of the first and the second retiming circuits.

19. The integrated circuit of claim 18 wherein an input of the third delay circuit is coupled to a data input for the integrated circuit.

20. The integrated circuit of claim 15 wherein the first retiming circuit and second retiming circuit are part of a double data-rate input cell.

21. The integrated circuit of claim 20 wherein the integrated circuit is a field programmable gate array.

22. The integrated circuit of claim 14 wherein the skew in the rising and falling edges of the output of the first phase shift circuit are at least partially due to inductive and capacitive effects of a circuit trace.

23. An integrated circuit comprising:
a phase shift circuit to phase shift a clock input signal;
a first adjustable delay circuit to delay the phase-shifted clock input signal;
a second adjustable delay circuit to delay the phase-shifted clock input signal, wherein the first adjustable delay circuit and the second adjustable delay circuit are independently adjustable from each other;
a first retiming circuit to retime a first data signal to edges of the phase-shifted clock input signal delayed by the first adjustable delay circuit; and
a second retiming circuit to retime the first data signal to edges of the phase-shifted clock input signal delayed by the second adjustable delay circuit.

24. The integrated circuit of claim 23, wherein the first adjustable delay circuit independently adjusts an output of the phase shift circuit to compensate for skew in rising edges of the output of the phase shift circuit, and wherein the second adjustable delay circuit independently adjusts the output of the phase shift circuit to compensate for skew in falling edges of the output of the phase shift circuit.

25. The integrated circuit of claim 24, wherein the first retiming circuit retimes the first data signal to rising edges of the phase-shifted clock input signal delayed by the first adjustable delay circuit, and wherein the second retiming circuit retimes the first data signal to falling edges of the phase-shifted clock input signal delayed by the second adjustable delay circuit.

* * * * *

UNITED STATES PATENT AND TRADEMARK OFFICE
CERTIFICATE OF CORRECTION

PATENT NO. : 7,590,879 B1  Page 1 of 1
APPLICATION NO. : 11/043524
DATED : September 15, 2009
INVENTOR(S) : Kim et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 345 days.

Signed and Sealed this

Twenty-first Day of September, 2010

David J. Kappos
*Director of the United States Patent and Trademark Office*